C. R. BIRDSEY.
PLASTER BOARD.
APPLICATION FILED AUG. 19, 1920.

1,384,298. Patented July 12, 1921.

Witnesses:
W. F. Kilroy
Harry R. L. White

Inventor:
Charles R. Birdsey
By Hies & Hie
Attys

UNITED STATES PATENT OFFICE.

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS.

PLASTER-BOARD.

1,384,298.  Specification of Letters Patent.  Patented July 12, 1921.

Application filed August 19, 1920. Serial No. 404,670.

*To all whom it may concern:*

Be it known that I, CHARLES R. BIRDSEY, a citizen of the United States, residing at Hinsdale, in the county of Dupage and State of Illinois, have invented certain new and useful Improvements in Plaster-Board, of which the following is a description.

My invention belongs to that general class of devices known as plaster board or the like, and relates particularly to an improved board which will be simple, substantial durable, satisfactory, efficient and which may be economically and accurately manufactured. The invention relates particularly to the type of board shown in my pending application Serial Number 247,244, filed July 29, 1918, of which this is a continuing application. Many other objects and advantages of the construction will be obvious to those skilled in the art from the disclosure herein given.

To this end my invention consists in the novel construction, arrangement and combination of parts herein shown and described, and more particularly pointed out in the claims.

Figure 1:
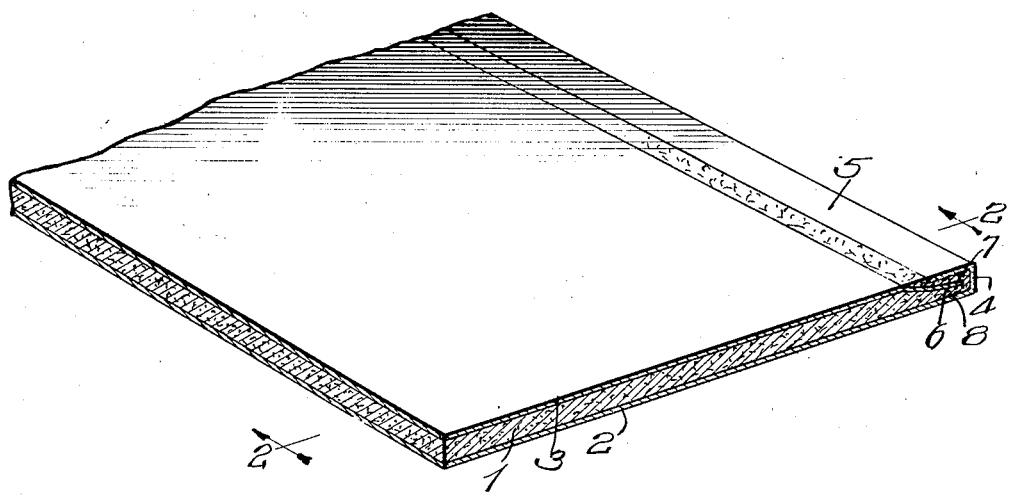
Figure 2:
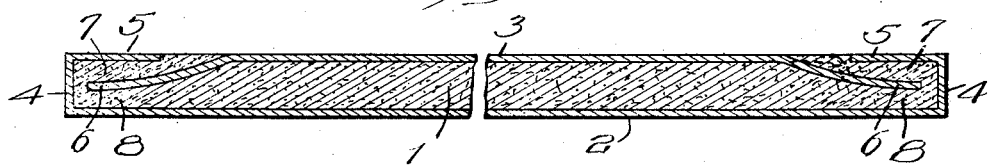

In the drawings, wherein like reference characters indicate like or corresponding parts, Figure 1 is a perspective view of a portion of the plaster board embodying the invention; and Fig. 2 is a sectional view taken substantially on line 2—2 of Fig. 1, showing both edges of the board.

Referring to the drawings, 1 represents a body of suitable material, for example, plaster, plaster Paris or the equivalent suitable for the purpose, which may be handled in a plastic state and thereafter be allowed to set or harden. The body is inclosed between the sheets 2 and 3 of suitable covering material, and in this connection it may be mentioned that I have found paper of the desired stiffness, weight and thickness very satisfactory for the purpose. In making the board, a layer or layers of plastic material 1 forming the body of the board is placed on the sheet 2, which is preferably turned or held up at one or on opposite edges and the covering sheet 3 placed over the plastic material. During the forming of the board the outer edge or edges of the sheet 2 are preferably turned over as at 4 and 5. After the plastic material forming the body 1 is placed on the sheet 2 and the covering sheet 3 applied, the extreme outer edge or edges 5 of the lower sheet are turned over the body so as to overlie the body and outer edges 6 of the sheet 3. The edge 5 is secured down in any suitable manner, preferably by utilizing the plastic body material, for example, by allowing a portion of the plastic material to flow between the two sheets during the manufacture of the board. Where the plastic material of the kind described is used as the body 1, this will serve as a seal and binder and efficiently secure the two sheets together at this point.

In the application hereinbefore referred to, in which the preferred form of board is illustrated, the edge 6 was, in so far as possible, maintained up during the manufacture so that the edges 5 and 6 were substantially close together. There is therein shown, however, how the edge may be turned down or be permitted to be depressed, as herein illustrated, so that the edge is embedded to a substantial depth in the material of the body with the flange portion 5 being supported or held in place by the material of the body between said embedded edge portion and the flange portion. The material from below the edge 6 may work about the extreme edge of the sheet 3 so as to form the portion 7, which, being in a plastic state, easily works around the edge and inwardly of the board so as to provide a perfect seal. As is obvious, there is no weakening of the board, as almost the entire body is present, except possibly at the extreme edge of the sheet 3, at which point a reduction in the amount of material is not harmful. The turned down portion of the sheet 3 may be as indicated in the full or dotted lines, in Fig. 2, or in an equivalent form, and as a matter of fact this may vary along the board edge, and depend on the care and skill employed in the manufacture as well as the machine used for the purpose. It is immaterial as to whether the edge of the board is square, rounded or beveled. If any excess of the plastic sealing material flows out past the extreme edge of the flange portion 5 of the sheet 3, the same is spaced back from the edge of the board so that even if not entirely removed from the board the extreme edges are of pleasing appearance and perfectly true, there being no protruding plastic material at the edge of the board.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A plaster board comprising a plaster body and opposed sheets of fibrous material adhering to and forming a covering for said plaster body, one of said sheets being wider than the opposed sheet and inclosing the edges of the plaster body and overlapping the marginal parts of the other sheet, the said other sheet having its marginal parts depressed below said overlapping marginal parts of the opposed sheet with a substantial plaster layer interposed between the adjacent parts of the overlapping and underlapping marginal parts of said sheets.

2. A plaster board comprising a body, a covering of fibrous material adhering to one face of the body and extending to adjacent the edges of the body, and embedded in the body thereat, and a covering of fibrous material for the other face of the body folded over to inclose the edge of the body and overlying the edge of the body and said embedded edge of the first mentioned covering, said folded over portion supported by the portion of the body above the said embedded edge portion.

3. A plaster board comprising a body, a covering of fibrous material adhering to one face of the body and extending to adjacent one edge of the body and embedded a substantial depth in the material of the body, and a covering of fibrous material for the other face of the body folded over to inclose the edge of the body and overlying a portion of the body and the edge of said first mentioned covering, said folded over portion being held in place by the material of the body above said embedded edge portion.

4. A plaster board comprising a body, a covering material having its major intermediate portion adhering to one face of the body and extending to adjacent the edge of the body, the edge of said covering material being substantially embedded in the body, and a covering material for the other face of the body folded over to inclose the edge of the body and overlie the edge of the body and said embedded edge of the first mentioned covering material, said folded-over portion being supported by the portion of the body above the said embedded edge portion, and the folded-over portion, the intermediate portion of the first covering material and the intervening body material occupying substantially the same plane to provide a practically continuous flat surface.

In testimony whereof I have hereunto signed my name in the presence of two subscribing witnesses.

CHARLES R. BIRDSEY.

Witnesses:
 Roy W. Hill,
 Bernice D. Jackson.